US012602610B2

(12) United States Patent
Xu et al.

(10) Patent No.: US 12,602,610 B2
(45) Date of Patent: Apr. 14, 2026

(54) CLASSIFICATION BASED ON IMBALANCED DATASET

(71) Applicant: International Business Machines Corporation, Armonk, NY (US)

(72) Inventors: Jing Xu, Xi'an (CN); Si Er Han, Xi'an (CN); Xue Ying Zhang, Xi'an (CN); Xiao Ming Ma, Xi'an (CN); Ji Hui Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1240 days.

(21) Appl. No.: 17/465,916

(22) Filed: Sep. 3, 2021

(65) Prior Publication Data

US 2023/0072913 A1 Mar. 9, 2023

(51) Int. Cl.
*G06N 20/00* (2019.01)

(52) U.S. Cl.
CPC .................................... *G06N 20/00* (2019.01)

(58) Field of Classification Search
CPC ................................ G06N 20/00; G06N 20/20
See application file for complete search history.

(56) References Cited

U.S. PATENT DOCUMENTS

| | | | |
|---|---|---|---|
| 10,813,583 B2 | 10/2020 | Kaji | |
| 12,314,385 B1* | 5/2025 | Beauchesne | ........... G06N 20/00 |
| 2014/0279745 A1 | 9/2014 | Esponda | |
| 2019/0050715 A1* | 2/2019 | Ooi | ........................ G06N 3/063 |

| | | | |
|---|---|---|---|
| 2021/0160148 A1* | 5/2021 | Kolar | ..................... G06N 20/00 |
| 2022/0232017 A1* | 7/2022 | Qualls | ................. H04L 63/1416 |
| 2023/0024884 A1* | 1/2023 | Casserini | .............. G06F 18/217 |

FOREIGN PATENT DOCUMENTS

| | | |
|---|---|---|
| CN | 108694413 A | 10/2018 |
| CN | 109658124 A | 4/2019 |
| CN | 110796482 A | 2/2020 |
| CN | 110825819 A | 2/2020 |
| CN | 111161884 A | 5/2020 |
| CN | 111209977 A | 5/2020 |

(Continued)

OTHER PUBLICATIONS

The State Intellectual Property Office of People's Republic of China, "First Office Action", Jul. 12, 2025, 7 Pages, CN Application No. 202210919496.7.

(Continued)

*Primary Examiner* — Ryan C Vaughn
(74) *Attorney, Agent, or Firm* — Caleb D. Wilkes

(57) ABSTRACT

Methods, systems, and computer program products perform classification based on an imbalanced dataset. In a method, machine learning models are generated based on positive samples included in an imbalanced dataset. An amount of the positive samples is less than an amount of negative samples that are included in the imbalanced dataset. Each sample in the positive and negative samples includes parameters. Multiple influential parameter groups are identified from the parameters for the positive samples, respectively. A final predictive model is determined based on the machine learning models and the multiple influential parameter groups. The final predictive model is used for classifying a sample as a positive type or a negative type.

23 Claims, 5 Drawing Sheets

900

GENERATE A PLURALITY OF PREDICTIVE MODELS BASED ON A PLURALITY OF POSITIVE SAMPLES INCLUDED IN AN IMBALANCED DATASET, RESPECTIVELY
910

IDENTIFY FROM THE PLURALITY OF PARAMETERS A PLURALITY OF INFLUENTIAL PARAMETER GROUPS FOR THE PLURALITY OF POSITIVE SAMPLES, RESPECTIVELY
920

DETERMINE A FINAL PREDICTIVE MODEL BASED ON THE PLURALITY OF PREDICTIVE MODELS AND THE PLURALITY OF INFLUENTIAL PARAMETER GROUPS, THE FINAL PREDICTIVE MODEL BEING USED FOR CLASSIFYING A SAMPLE INTO ONE OF A POSITIVE TYPE AND A NEGATIVE TYPE
930

(56) References Cited

FOREIGN PATENT DOCUMENTS

| CN | 111310814 A | 6/2020 |
| CN | 111626336 A | 9/2020 |
| CN | 112990277 A | 6/2021 |
| CN | 115758228 A | 3/2023 |
| EP | 2244213 B1 | 10/2015 |
| JP | 2017-169884 A | 9/2017 |
| JP | 2023-037568 A | 3/2023 |
| KR | 101563406 B1 | 10/2015 |
| WO | 2009/078096 A1 | 6/2009 |
| WO | 2019169704 A1 | 9/2019 |

OTHER PUBLICATIONS

Japan Patent Office, "Notice of Reasons for Refusal" Sep. 2, 2025, 08 Pages, JP Application No. 2022-110475.

"Unveiling the Black Box model using Explainable AI (Lime, Shap) Industry use case", Downloaded from the internet on Jul. 26, 2021, 24 Pages, <https://www.analyticsvidhya.com/blog/2020/10/unveiling-the-black-box-model-using-explainable-ai-lime-shap-industry-use-case/>.

Brisimi et al,. "Predicting Chronic Disease Hospitalizations from Electronic Health Records: An Interpretable Classification Approach", 0018-9219 © 2010 IEEE, DOI:10.1109/jproc.2017.2789319, pp. 1-18, <https://ieeexplore.ieee.org/document/8283520>.

Disclosed Anonymously et al, "System for imbalance training data adjustment", IP.com Prior Art Database Technical Disclosure, IPCOM/000263702D, pp. 1-3.

Galar et al., "A Review on Ensembles for the Class Imbalance Problem: Bagging-, Boosting-, and Hybrid-Based Approaches", IEEE Transactions on systems, Man, and cybernetics, Part C (Applications and Reviews) © 2011 IEEE, vol. 42, No. 4, pp. 1-22, ,doi: 10.1109/TSMCC.2011.2161285.

Interpreting Classification Model with Lime, Accessed from internet on Jul. 26, 2021, pp. 1-26, <https://algotech.netlify.app/blog/interpreting-classification-model-with-lime/>.

Mell et al., "The NIST Definition of Cloud Computing", National Institute of Standards and Technology, Special Publication 800-145, Sep. 2011, 7 pages.

Tarekegn et al., "Predictive Modeling for Frailty Conditions in Elderly People: Machine Learning Approaches", JMIR Medical Informatics, 2020;8(6):e16678), doi. 10.2196/16678, pp. 1-16, <https://medinform.jmir.org/2020/6/e16678/>.

Ancy et al., "Handling imbalanced data with concept drift by applying dynamic sampling and ensemble classificiation model", Computer Communications, Mar. 1, 2020, pp. 553-560, vol. 153, doi: https://doi.org/10.1016/j.comcom.2020.01.061.

Xin-Peng et al., "Prediction model of disk failure based on adaptive weighted bagging-GBDT algorithm under imbalaced dataset", Microelectronics & Computer, Mar. 2020, vol. 37, No. 3, pp. 14-19(English abstract submitted).

* cited by examiner

900

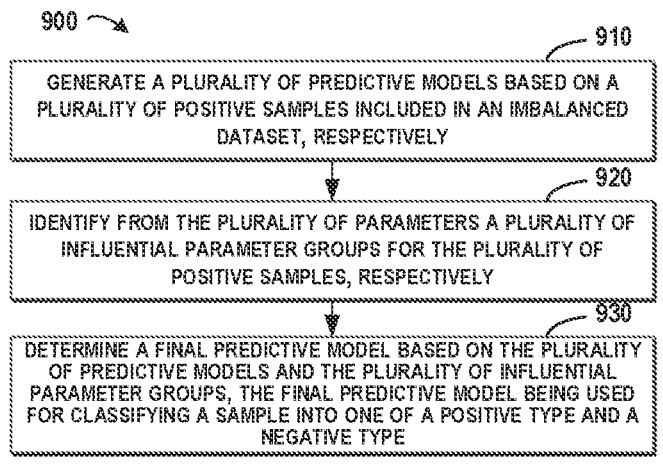

910

GENERATE A PLURALITY OF PREDICTIVE MODELS BASED ON A PLURALITY OF POSITIVE SAMPLES INCLUDED IN AN IMBALANCED DATASET, RESPECTIVELY

920

IDENTIFY FROM THE PLURALITY OF PARAMETERS A PLURALITY OF INFLUENTIAL PARAMETER GROUPS FOR THE PLURALITY OF POSITIVE SAMPLES, RESPECTIVELY

930

DETERMINE A FINAL PREDICTIVE MODEL BASED ON THE PLURALITY OF PREDICTIVE MODELS AND THE PLURALITY OF INFLUENTIAL PARAMETER GROUPS, THE FINAL PREDICTIVE MODEL BEING USED FOR CLASSIFYING A SAMPLE INTO ONE OF A POSITIVE TYPE AND A NEGATIVE TYPE

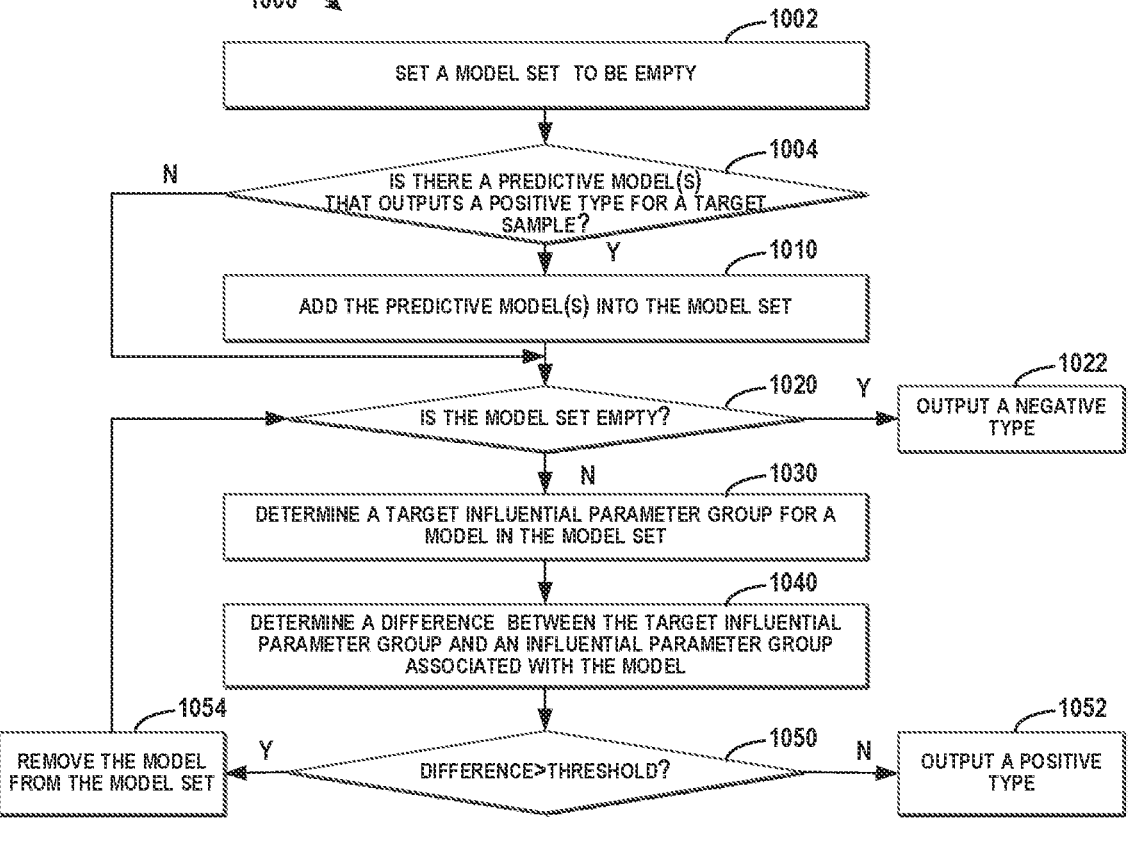

1002

SET A MODEL SET TO BE EMPTY

1004

N          IS THERE A PREDICTIVE MODEL(S) THAT OUTPUTS A POSITIVE TYPE FOR A TARGET SAMPLE?

Y          1010

ADD THE PREDICTIVE MODEL(S) INTO THE MODEL SET

1020          Y          1022

IS THE MODEL SET EMPTY?          OUTPUT A NEGATIVE TYPE

N          1030

DETERMINE A TARGET INFLUENTIAL PARAMETER GROUP FOR A MODEL IN THE MODEL SET

1040

DETERMINE A DIFFERENCE BETWEEN THE TARGET INFLUENTIAL PARAMETER GROUP AND AN INFLUENTIAL PARAMETER GROUP ASSOCIATED WITH THE MODEL 1054          1050          1052

REMOVE THE MODEL FROM THE MODEL SET          Y          DIFFERENCE>THRESHOLD?          N          OUTPUT A POSITIVE TYPE

*FIG. 10*

CLASSIFICATION BASED ON IMBALANCED DATASET

BACKGROUND

The present disclosure relates to classification, and more specifically, to methods, systems and computer program products for generating a predictive model based on an imbalanced dataset.

Nowadays, classification techniques are widely used in various working environments. For example, a sample including multiple parameters of a computing system may be collected for predicting whether a failure occurs in the computing system. A predictive model may be generated in advance based on an imbalanced dataset including a plurality of samples of the computing system that are collected at previous time points.

Current classification techniques suffer due to traditional models not determining the number of positive cases of failure because the results are too small to determine a positive rate especially when the rate is smaller than, for example, 0.01%. Additionally, current solutions suffer from unsatisfied higher false positive rates and negative cases are predicted incorrectly due to incorrect patterns learned by the predictive model.

SUMMARY

According to embodiments of the present disclosure, there is provided a computer-implemented method that may be implemented by one or more processors. In the method, one or more processors generate a plurality of predictive models based on a plurality of positive samples included in an imbalanced dataset, respectively, an amount of the plurality of positive samples being below an amount of a plurality of negative samples that are included in the imbalanced dataset, and each sample in the plurality of positive and negative samples including a plurality of parameters. One or more processors identify from the plurality of parameters a plurality of influential parameter groups for the plurality of positive samples, respectively. One or more processors determine a final predictive model based on the plurality of predictive models and the plurality of influential parameter groups, the final predictive model being used for classifying a sample into one of a positive type and a negative type. With these embodiments, the positive model may be generated based on the imbalanced dataset in an accurate and effective way.

According to another embodiment of the present disclosure, there is provided a computer-implemented system. The computer-implemented system comprises a computer processor coupled to a computer-readable memory unit, where the memory unit comprises instructions that when executed by the computer processor implements the above method.

According to another embodiment of the present disclosure, there is provided a computer program product. The computer program product comprises a computer readable storage medium having program instructions embodied therewith. The program instructions are executable by an electronic device to cause the electronic device to perform actions of the above method.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent. The same references generally refer to the same components in the embodiments of the present disclosure.

FIG. 9 depicts an example flowchart of a method for generating a final predictive model based on an imbalanced dataset according to embodiments of the present disclosure.

FIG. 10 depicts an example flowchart of a method for classifying a target sample based on a final predictive model according to embodiments of the present disclosure.

DETAILED DESCRIPTION

Figure 1:
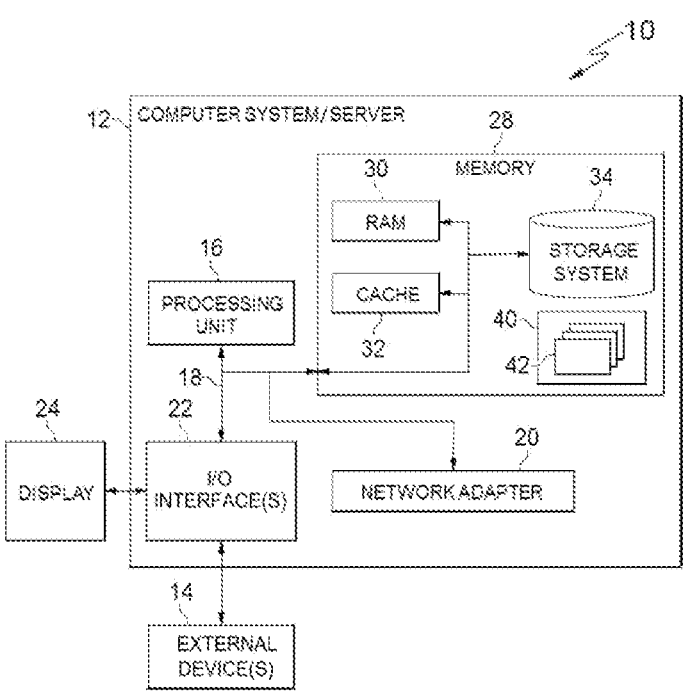
FIG. 1 depicts a cloud computing node according to embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and so on.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that are accessible by computer system/server 12, and they include both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, database system 34 can be provided for reading from and writing to a non-removable, non-volatile magnetic medium (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival database systems, etc.

Figure 2:
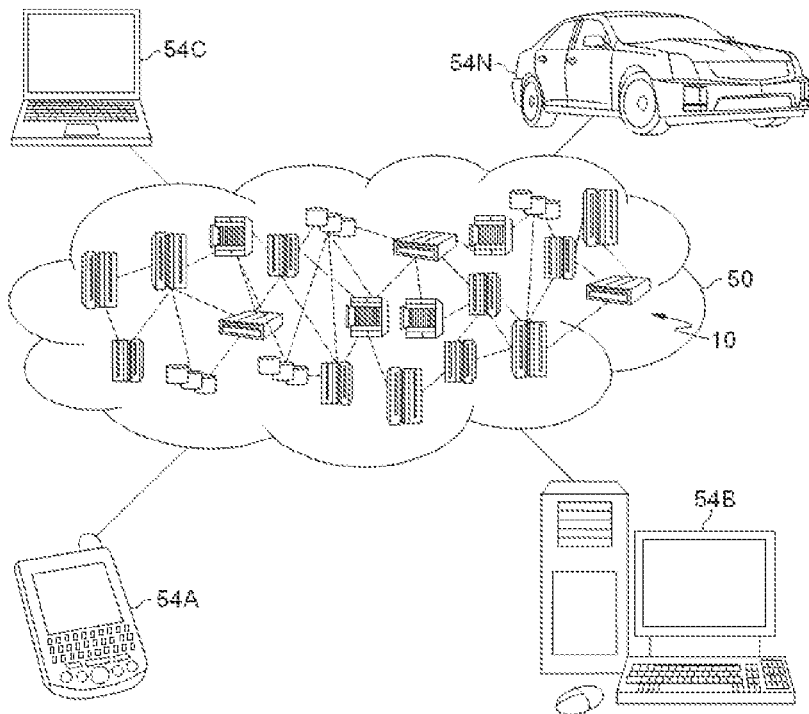
FIG. 2 depicts a cloud computing environment according to embodiments of the present disclosure.

Referring now to FIG. 2, FIG. 2 depicts illustrative cloud computing environment 50. As shown, cloud computing environment 50 includes one or more cloud computing nodes 10 with which local computing devices used by cloud consumers, such as personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
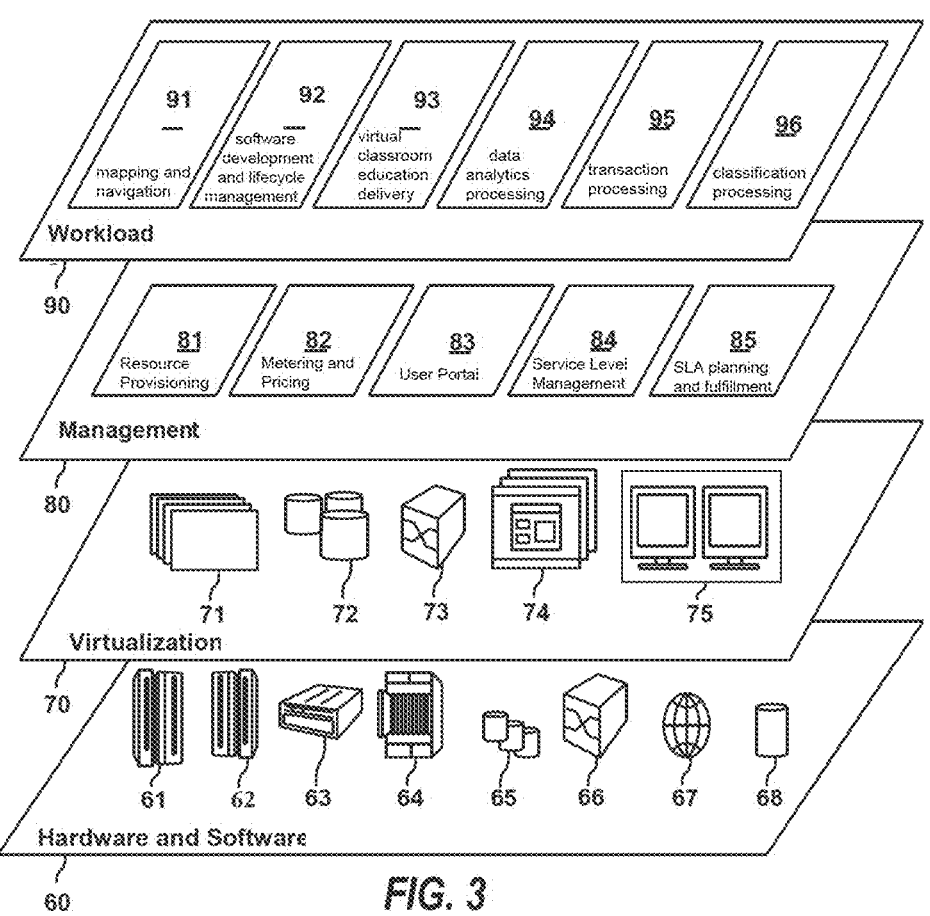
FIG. 3 depicts abstraction model layers according to embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and classification processing 96.

It should be noted that the classification processing 96 according to embodiments of the present disclosure could be implemented by computer system/server 12 of FIG. 1. The classification processing 96 may be implemented in various types of working environments. For example, the classification processing 96 may be used for generating a predictive model for determining whether a failure occurs in a computing system based on a historical dataset. Here, the failure refers to an abnormal state of the computing system and requires technical engineers' further supports. However, as the computing system rarely fails and runs normally most of the time, compared with a large amount of negative samples (where the computing system runs normally), the dataset only includes a small amount of positive samples (where a failure occurs in the computing system).

Figure 4:
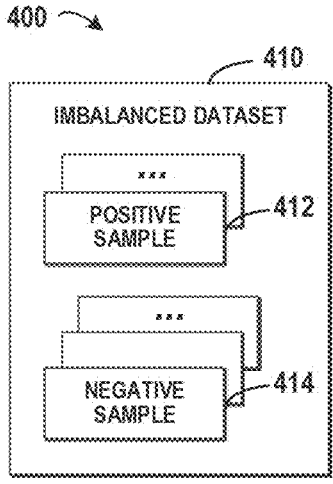
FIG. 4 depicts an example diagram of an imbalanced dataset for generating a predictive model according to embodiments of the present disclosure.

Reference will be made to FIG. 4 for a brief overview of the imbalanced dataset. FIG. 4 depicts an example diagram 400 of an imbalanced dataset for generating a predictive model according to embodiments of the present disclosure. In FIG. 4, an imbalanced dataset 410 includes a plurality of positive samples 412 and a plurality of negative samples 414; however, an amount of the plurality of positive samples 412 is far below an amount of the plurality of negative samples 414. For example, the dataset may include 10000 samples, where 9500 samples are negative samples and only 500 samples are positive samples. At this point, if the predictive model is directly generated from the imbalanced dataset, an accuracy of the predictive model will not be satisfied.

There have proposed some solutions for imbalance classification. In one solution, over-sampling and under-sampling techniques are adopted for generating a balanced dataset from the imbalanced dataset. In another solution, Synthetic Minority Oversampling Technique (SMOTE) may be used to simulate positive samples, so as to generate a balanced dataset. The predictive model may be trained with the balanced dataset. However, the above solutions involve complex procedures and high workload. Moreover, the accuracy of the generated predictive model is low.

Figure 5:
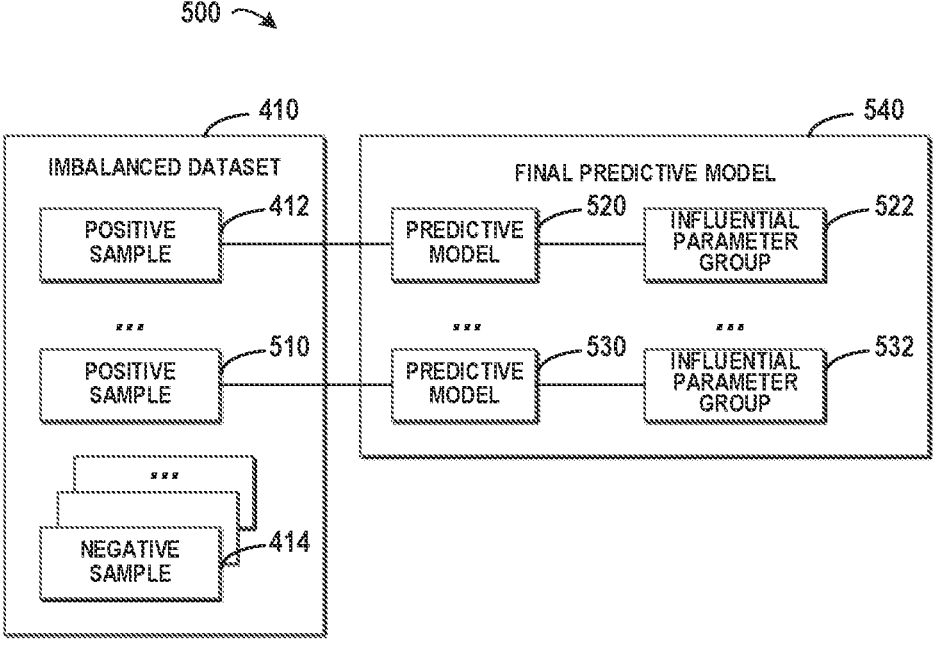
FIG. 5 depicts an example diagram for generating a predictive model based on an imbalanced dataset according to embodiments of the present disclosure.

In view of the above drawbacks, embodiments of the present disclosure may provide solutions for generating a predictive model. Reference will be made to FIG. 5 for a brief discussion of embodiments of the present disclosure. FIG. 5 depicts an example diagram for generating a predictive model based on an imbalanced dataset according to embodiments of the present disclosure. In FIG. 5, an imbalanced dataset 410 may be used to generate a final predictive model for classifying a sample into one of a positive type and a negative type. Here, the imbalanced dataset 410 may include only a small amount of positive samples 412, . . . , 510, and a large amount of negative samples 414. Each sample may include a plurality of parameters, and in the environment of predicting a failure in a computing system, the parameters may include multiple aspects of the computing system and an example data structure of the sample is illustrated in Table 1.

TABLE 1

| | Data Structure of Parameters in a Sample | | | | | |
|---|---|---|---|---|---|---|
| ID | CPU usage rate | Memory usage rate | Power | Disk status | . . . | Failure |
| 1 | | | | | | |
| 2 | | | | | | |
| . . . | | | | | | |

Here, the positive sample may include parameters when a failure occurs in the computing system (where the "failure" parameter is set to "True"), and the negative sample may include parameters when the computing system is in good condition (where the "failure" parameter is set to "False"). As shown in FIG. 5, an individual predictive model may be generated based on an individual positive sample. Specifically, a predictive model 520 is generated for the positive sample 412, . . . , and a predictive model 530 is generated for the positive sample 510. Further, the influential predictor analysis may be performed on the positive sample and the corresponding predictive model, so as to identify an influential parameter group for the positive sample. Referring to FIG. 5, an influential parameter group 522 may be identified for the positive sample 412, and an influential parameter group 532 may be identified for the positive sample 510, and so on. Further, the final predictive model 540 may be generated based on the plurality of predictive models 520, . . . , and 530 and the plurality of influential parameter groups 522, . . . , and 532. With these embodiments, one predictive model is generated based on one positive sample, and thus information in the positive samples may be fully extracted for building the final predictive model. Therefore, the accuracy level of the final predictive model may be greatly increased.

Figure 6:
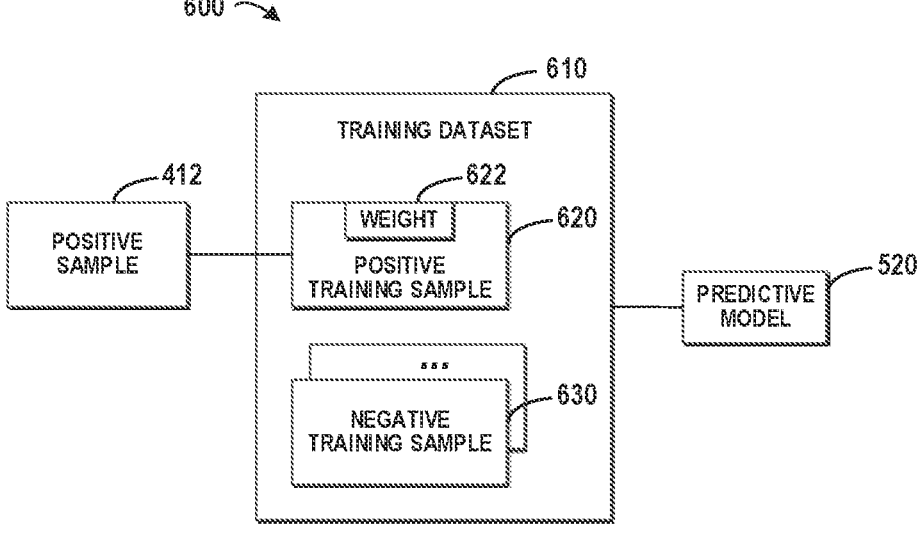
FIG. 6 depicts an example diagram for generating a predictive model based on a positive sample in an imbalanced dataset according to embodiments of the present disclosure.

Hereinafter, reference will be made to FIG. 6 for more details for generating the multiple models based on the multiple positive samples in the imbalanced dataset. In some embodiments of the present disclosure, a balanced training dataset may be generated based on an individual positive sample in the imbalanced dataset 410. FIG. 6 depicts an example diagram 600 for generating a predictive model based on a positive sample in an imbalanced dataset according to embodiments of the present disclosure. In FIG. 6, a balanced training dataset 610 is generated for the positive sample 412 based on the imbalanced dataset 410. Here, the training dataset 610 includes at least one positive training sample 620 and a plurality of negative training samples 630. Further, the predictive model 520 may be generated based on existing machine learning techniques. For example, an initial predictive model may be obtained and trained based on training samples in the training dataset 610.

The training samples in the training dataset 610 may be obtained in various ways. In some embodiments, the negative training sample may be selected directly from the plurality of negative samples 414 in the imbalanced dataset 410. Alternatively and/or in addition thereto, the positive sample 412 may be modified to obtain a negative training sample. For example, one or more parameters in the positive sample 412 may be adjusted to simulate a negative training sample. Supposing the CPU usage rate is a key parameter for detecting a failure in the computing system, the higher the CPU usage rate is, the higher the possibility of a failure occurring in the computing system. Therefore, the CPU usage rate in the positive sample 412 may be adjusted to a lower value within a normal range for simulating a negative training sample.

In some embodiments, a threshold (such as 1000 or another value) may be defined for the total number of samples in the balanced training dataset 610. At this point, the amount of the negative training samples may be determined as 1000/2=500. Some of the negative training samples may be selected from negative samples in the imbalanced database 410, and some of the negative training samples may be generated by modifying the positive sample 412. With these embodiments, the negative training samples may be obtained in an easy and effective way.

In some embodiments of the present disclosure, the positive sample 412 may be directly obtained from the imbalanced dataset 410 and work as the positive training sample 620. As the training dataset 610 should be a balanced dataset, the amount of the positive training samples should be similar to the amount of the negative training samples. Considering a shortage of the positive training samples, the positive training sample may be assigned with a weight based on a ratio of the number of the plurality of negative training samples and the number of the at least one positive training sample. Continuing the above example, as the number of the negative training samples 630 is 500 (a half of the total number "1000") and there is only one positive training sample 620, the weight may be set to 500. With these embodiments, the complex procedure for simulating a large amount of positive training samples is not required. Instead, the positive training sample may be directly obtained in an easy and effective way.

In some embodiments, the training dataset 610 may include more than one positive training sample, and thus more positive training samples may be generated based on the positive sample 412. For example, the CPU usage rate in the positive sample 412 may be slightly increased to simulate another positive training sample. Further, the obtained positive training sample 620 and the negative training sample 630 may be added into the training dataset 610 for the training procedure. Therefore, embodiments of the present disclosure do not require complex procedures and the workload for generating the training dataset may be decreased. In some embodiments, the balanced training dataset 610 may be used for training an initial predictive model. After the training procedure, the predictive model 520 may be generated automatically.

The above paragraphs only provide an example procedure for generating the predictive model 520 for the positive sample 412. Other positive samples may be subjected to similar processing so as to obtain the plurality of predictive models 520, . . . , and 530. Once the predictive model 520 is generated, the influential predictor analysis may be performed on the predictive model, so as to identify an influential parameter group for the positive sample 412. The influential predictor analysis is for analyzing a relationship between a sample and a predictive model that is generated based on the sample. Specifically, a group of influential parameters that causes the sample to be classified as a positive type may be identified from the plurality of parameters. For example, a group of parameters of (CPU usage rate, Memory usage rate, . . . ) may be identified from the above Table 1 as the influential parameter group 522 for the positive sample 412.

In some embodiments, an influential parameter group may be identified for each of the positive samples. Here the influential parameter group includes a group of parameters in the plurality of parameters that cause the positive sample to be classified as a positive type. Specifically, the Local Interpretable Model Agnostic Explanations (LIME) method may be used for identifying the influential parameter group, and details of the LIME method will be omitted hereinafter. By now, the LIME method is a mature technology and various LIME tools are provided for determining the influential parameter group. In some embodiments, a positive sample and a predictive model may be inputted into a LIME tool, and then the LIME tool may output an influential parameter group associated with the positive sample and the predictive model. Here, the influential parameter group includes a group of parameters in the plurality of parameters that cause the positive sample to be classified as a positive type. Therefore, all the predictive models may be processed based on the LIME tool, such that the influential parameter group 522 may be identified for the positive sample 412 based on the predictive model 520, and the influential parameter group 532 may be identified for the positive sample 510 based on the predictive model 530.

Further, the final predictive model 540 may be generated based on the plurality of predictive models 520, . . . , 530 and the plurality of influential parameter groups 522, . . . , 532.

Here the final predictive model may be used for classifying a sample into one of a positive type and a negative type. With these embodiments, the multiple predictive models that are generated based on the multiple positive samples may provide more knowledge for the prediction. As the multiple predictive models are built based on different training datasets, the multiple predictive models may reflect various aspects for the prediction. In other words, the final predictive model may include rich knowledge that fully reflects all the factors for determining a failure. Here, the multiple predictive models may work together for classifying a further sample, and thus the accuracy level of the final predictive model may be greatly increased.

In some embodiments, the final predictive model 540 may be updated as the time runs. For example, during operations of the computing system, more positive samples may be collected by monitoring the multiple parameters. Once a further positive sample is added into the imbalanced dataset 410, a further predictive model may be generated based on the further positive sample, and a further influential parameter group may be identified for the further predictive model. Next, the final predictive model may be updated based on the further predictive model and the further influential parameter group. With these embodiments, the final predictive model 540 may be updated based on more positive samples, such that the accuracy level of the final predictive model 540 may be gradually increased.

Figure 7:
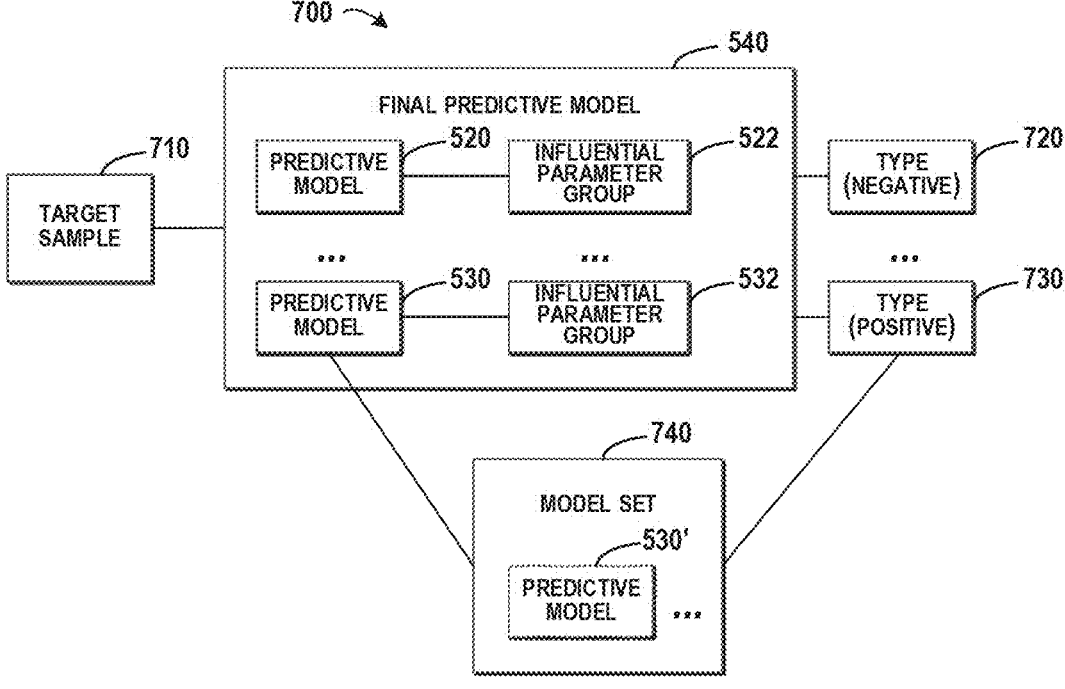
FIG. 7 depicts an example diagram for generating a model set for a target sample according to embodiments of the present disclosure.

In some embodiments, the final predictive model 540 may be used for classifying an incoming sample. Hereinafter, reference will be made to FIG. 7 for more details. FIG. 7 depicts an example diagram 700 for generating a model set for a target sample according to embodiments of the present disclosure. In FIG. 7, a target sample 710 may be inputted into the final predictive model 540, and the data structure of the target sample 710 is identical to that of the training sample for generating the final predictive model 540. In the final predictive model 540, the target sample 710 may be inputted into each of the multiple predictive models 520, . . . , 530. Here, the multiple predictive models 520, . . . , and 530 may work independently and output multiple predictive types 720, . . . , and 730, respectively. For example, the predictive model 520 may output a negative type 720, . . . , the predictive model 530 may output a positive type 730.

Further, a model set 740 may be created based on the results from the multiple predictive models 520, . . . , and 530. Here, if it is determined that a predictive type indicates a positive type, a predictive model corresponding to the positive type may be added into the model set 740. In other words, the predictive model(s) that output positive predictive type(s) may be added into the model set 740. In FIG. 7, the predictive model 530 outputs a positive predictive type, and thus the predictive model 530 is added into the model set 740 (represented as a predictive model 530'). Here, the amount of models in the model set 740 is identical to the amount of the positive types that are outputted by the final predictive model 540. In these embodiments, the model set 740 may be used as a base for classifying the target sample 710.

In some embodiments of the present disclosure, if the model set 740 is empty, it indicates that all the predictive models 520, . . . , 530 classify the target sample 710 into the negative type. At this point, the target sample 710 may be classified as the negative type. Compared with existing solutions where only one predictive model is used, in the present embodiment, all the predictive models 520, . . . , 530 output the negative type. Therefore, the confidence level of the final classification type is higher.

Figure 8:
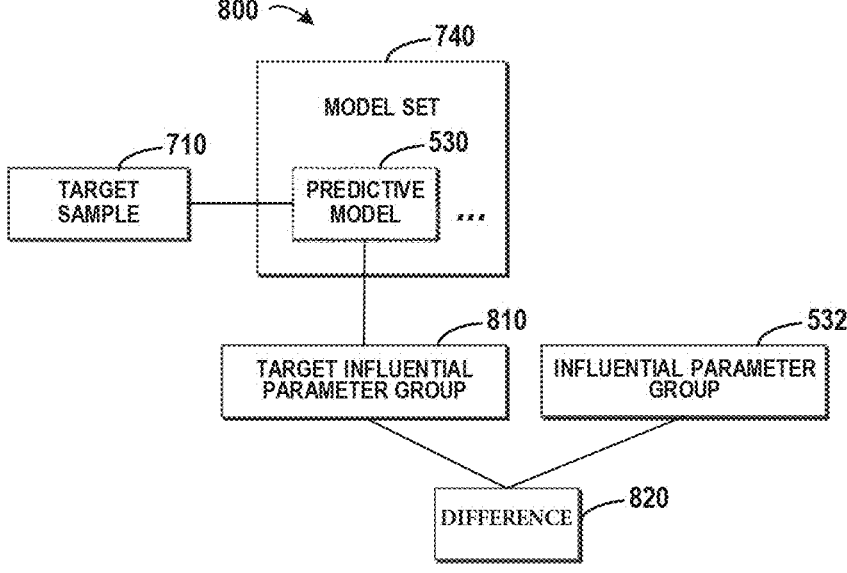
FIG. 8 depicts an example procedure for updating a model set based on a difference between a target influential parameter group and an influential parameter group according to embodiments of the present disclosure.

In some embodiments, if the model set 740 is not empty (i.e., including one or more predictive models that output the positive type), the predictive model(s) in the model set may be subjected to further processing. Referring to FIG. 8, which figure depicts an example procedure 800 for updating a model set based on a difference between a target influential parameter group and an influential parameter group according to embodiments of the present disclosure. In FIG. 8, a target influential parameter group may be identified from the plurality of parameters for the target sample 710. Here, the LIME method may be performed on the predictive model 530 so as to identify the target influential parameter group 810 for the target sample 710. Further, the influential parameter group 532, which is associated with the predictive model 530, may be obtained from the final predictive model 540.

Here, the influential parameter group 532 includes parameters that cause the positive sample 510 to be classified into the positive type. Here, the influential parameter group is an indicator for measuring whether the predictive model 530 is suitable for classifying the incoming sample. If the influential parameter group for the incoming sample is similar to the influential parameter group 532, it means that the predictive model 530 is suitable; otherwise the predictive model 530 is not suitable. Accordingly, a difference 820 may be determined between the target influential parameter group 810 and the influential parameter group 532 for updating the model set 740. In some embodiments, if the difference 820 is above a predefined threshold, it indicates that the positive type 730 is outputted based on different parameters other than parameters included in the influential parameter group 532. Therefore, the output of the predictive model 530 is unreliable and thus the predictive model should be dropped. Otherwise, if the difference 820 is below the predefined threshold, it indicates that the positive type 730 is outputted based on similar parameters as those included in the influential parameter group 532. Therefore, the output of the predictive model 530 is reliable and thus the predictive model should be adopted.

In some embodiments, the threshold may be determined based on an overlap of the target influential parameter group 810 and the influential parameter group 532. If the target influential parameter group 810 and the influential parameter group 532 overlap completely, the output of the predictive model 530 is adopted. An overlap rate (for example, 90% or another value) may be defined as the threshold, if the overlap rate between the two groups is above 90%, the output is reliable; otherwise the output is unreliable and may be dropped. Further, continuing the above example of determining a failure in the computing system, if the influential parameter group 532 includes 10 parameters while the target influential parameter group 810 includes 8 parameters (among which only 5 parameters are included in the influential parameter group 532), the difference 820 is below the threshold and thus the predictive model 530 may be removed from the model set 740. In another example, if the difference 820 is above the threshold, the predictive model 530 may be maintained in the model set 740.

Although the above paragraphs have described the processing for only one predictive model 530, other predictive models in the model set 740 may be processed in a similar manner, such that the model set 740 may be updated. After all the predictive models are processed according to FIG. 8, the updated model set 740 may be used for determining a final type of the target sample 710. If the updated model set is empty, it indicates that all the reliable predictive models believe that the target sample 710 belongs to the negative type. Therefore, the target sample 710 may be classified as the negative type. Alternatively, if the updated model set is not empty, it indicates that one or more reliable predictive models believe that the target sample 710 belongs the positive type. Accordingly, the target sample may be classified as a positive type. With these embodiments, all the predictive models that output unreliable results are removed from the model set 740, and thus the model set 740 only include reliable predictive model(s). Therefore, the reliability of the final output may be increased.

The above paragraphs have described the embodiments in an environment of the computing system. Alternatively and/or in addition, embodiments of the present disclosure may be implemented a medical environment, an image processing environment, and so on. In the medical environment, the imbalanced dataset may include positive samples related to persons with cancer, and negative samples related to healthy persons, and thus a predictive model may be generated based on the imbalanced dataset. In the image processing environment, the imbalanced dataset may include positive samples related to pictures of unqualified products, and negative samples related to pictures of qualified products, and thus a predictive model may be generated based on the imbalanced dataset. With these embodiments, an accurate and effective predictive model may be generated from the imbalanced dataset in various working environments.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

Reference will be made to FIG. 9 for more details about embodiments of the present disclosure. FIG. 9 depicts an example flowchart of a method 900 for generating a final predictive model based on an imbalanced dataset according to embodiments of the present disclosure. Here, the method 900 may be implemented by one or more processors. At a block 910, a plurality of predictive models are generated based on a plurality of positive samples included in an imbalanced dataset, respectively, an amount of the plurality of positive samples being below an amount of a plurality of negative samples that are included in the imbalanced dataset, and each sample in the plurality of positive and negative samples including a plurality of parameters. At a block 920, a plurality of influential parameter groups for the plurality of positive samples is identified from the plurality of parameters, respectively. At a block 930, a final predictive model is determined based on the plurality of predictive models and the plurality of influential parameter groups, the final predictive model being used for classifying a sample into one of a positive type and a negative type.

In some embodiments, a predictive model in the plurality of predictive models is generated based on a positive sample in the plurality of positive samples. Specifically, a training dataset is generated based on the positive sample, the training dataset including at least one positive training sample and a plurality of negative training samples. The predictive model is generated by training an initial predictive model with the training dataset.

In some embodiments, the plurality of negative training samples are obtained by any of: selecting a negative sample from the plurality of negative samples, and modifying the positive sample into a negative sample; and adding the plurality of negative training samples into the training dataset.

In some embodiments, the at least one positive training sample is obtained based on the positive sample; and then a weight is assigned to the at least one positive training sample based on a ratio of an amount of the plurality of negative training samples and an amount of the at least one positive training sample.

In some embodiments, each positive sample in the plurality of positive samples is processed for identifying one group in the plurality of influential parameter groups. Specifically, an influential parameter group is identified for the positive sample, the influential parameter group including a group of parameters in the plurality of parameters that cause the positive sample to be classified as a positive type.

In some embodiments, the final predictive model is updated in response to a determination that a further positive sample is added into the imbalanced dataset. Specifically, a further predictive model is generated based on the further positive sample; a further influential parameter group is identified for the further predictive model from the plurality of parameters; and the final predictive model is updated based on the further predictive model and the further influential parameter group.

In some embodiments, if a target sample is received, a plurality of predictive types is determined for the target sample based on the plurality of predictive models included in the final predictive model, respectively. In response to a determination that all of the plurality of predictive types indicate a negative type, the target sample is classified into the negative type.

In some embodiments, in response to a determination that at least one predictive type in the plurality of predictive types indicates a positive type, a model set is generated and the model set includes at least one predictive model corresponding to the at least one predictive type. An influential parameter group associated with a predictive model in the model set is determined. Next, a target influential parameter group is identified from the plurality of parameters for the target sample. Further, the model set is updated based on a difference between the influential parameter group and the target influential parameter group, and then the target sample is classified based on the updated model set.

In some embodiments, in response to a determination that the difference is above a predefined threshold, the predictive model is removed from the model set; and in response to a determination that the difference is below the predefined threshold, the predictive model is maintained in the model set.

In some embodiments, in response to a determination that the updated model set is empty, the target sample is classified into a negative type; and in response to a determination that the updated model set is not empty, the target sample is classified into a positive type.

Reference will be made to FIG. 10 for more details for classifying a sample. FIG. 10 depicts an example flowchart of a method 1000 for classifying a target sample based on a final predictive model according to embodiments of the present disclosure. At a block 1002, a model set is set to be empty, and at a block 1004 it is determined whether there is a predictive model(s) that outputs a positive type for a target sample. If the result is "yes," the method 1000 proceeds to a block 1010; and if the result is "no," the method 1000 proceeds to a block 1020. At a block 1010, the predictive model(s) that outputs a positive type for a target sample is added into the model set. At a block 1020, if the model set is empty, the method 1000 proceeds to a block 1022 and outputs a negative type. Otherwise, if the model set is not empty, the method 1000 proceeds to a block 1030. At the block 1030, a target influential parameter group is determined for a model in the model set. Next, at a block 1040, a difference is determined between the target influential parameter group and an influential parameter group associated with the model. At a block 1050, if the difference is above a threshold, the method 1000 proceeds to a block 1054 and the model is removed from the model set. If the difference is below the threshold, the method proceeds to a block 1052 and outputs a positive type.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or so on, and procedural programming languages, such as the "C" programming language or similar programming languages. The computer readable program instructions may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   generating, by one or more processors, multiple machine learning models based on multiple positive samples included in an imbalanced dataset, wherein an amount of the multiple positive samples is less than an amount of multiple negative samples that are included in the imbalanced dataset, and wherein each of the multiple positive samples and the multiple negative samples includes respective parameters;
   identifying, by the one or more processors, from the respective parameters, multiple influential parameter groups respectively for the multiple positive samples, wherein the multiple influential parameter groups respectively cause the multiple machine learning models to classify an associated one of the multiple positive samples as a positive type;
   determining, by the one or more processors, a model set that includes at least some of the multiple machine learning models; and
   inputting a first new sample into the model set such that the model set, in response, classifies the first new sample as a positive type or a negative type, wherein the model set compares the multiple influential parameter groups to target influential parameter groups as part of the classifying.

2. The method of claim 1, wherein the generating the multiple machine learning models comprises:
   obtaining, by the one or more processors, a training dataset based on a first positive sample of the multiple positive samples, wherein the training dataset includes at least one positive training sample and negative training samples; and
   generating, by the one or more processors, the machine learning models by training an initial machine learning model with the training dataset.

3. The method of claim 2, wherein the obtaining the training dataset comprises:
   obtaining, by the one or more processors, the negative training samples, wherein the negative training samples include a first negative sample from the multiple negative samples of the imbalanced dataset and include a second negative sample obtained via modifying, into a negative sample, a second positive sample from the multiple positive samples of the imbalanced dataset; and
   adding, by the one or more processors, the multiple negative training samples into the training dataset.

4. The method of claim 2, wherein the obtaining the training dataset comprises:
   obtaining, by the one or more processors, the at least one positive training sample based on the first positive sample; and assigning, by the one or more processors, a weight to the at least one positive training sample based on a ratio of an amount of the negative training samples and an amount of the at least one positive training sample.

5. The method of claim 1, further comprising:

responsive to determining that a further positive sample is added into the imbalanced dataset, generating, by the one or more processors, a further machine learning model based on the further positive sample;

identifying, by the one or more processors, a further influential parameter group for the further machine learning model from parameters of the further positive sample; and updating, by the one or more processors, the model set to include the further machine learning model and the further influential parameter group.

6. The method of claim 1, further comprising:

responsive to determining that a target sample is received, determining, by the one or more processors, multiple types for the target sample as output from machine learning models included in the model set; and responsive to determining that all of the multiple types indicate the negative type, classifying, by the one or more processors, the target sample as the negative type.

7. A method comprising:

generating, by one or more processors, multiple machine learning models respectively based on multiple positive samples included in an imbalanced dataset, wherein an amount of the multiple positive samples is below an amount of multiple negative samples that are included in the imbalanced dataset, and wherein each of the multiple positive samples and the multiple negative samples includes respective parameters;

inputting a first new sample into the multiple machine learning models to respectively produce predictions that classify the first new sample as a positive type or a negative type;

responsive to determining that at least one of the predictions indicates the positive type, generating, by the one or more processors, a model set including at least one of the machine learning models whose prediction indicated the positive type;

determining, by the one or more processors, an influential parameter group associated with a first machine learning model in the model set, wherein the influential parameter group causes the first machine learning model to classify an associated one of the multiple positive samples as the positive type;

identifying, by the one or more processors, a target first influential parameter group for the first new sample with respect to the first machine learning model, wherein the target first influential parameter group causes the first machine learning model to classify the first new sample as the positive type;

removing, by the one or more processors, the first machine learning model from the model set in response to a difference between the influential parameter group and the first influential parameter group exceeding a predefined threshold value, wherein the removing changes the model set to an updated model set and the updated model set contains a smaller number of machine learning models than the model set contains; and classifying, by the one or more processors, the first new sample based on the updated model set.

8. The method of claim 7, further comprising:

determining, by the one or more processors, an influential parameter group associated with a second machine learning model in the model set, wherein the influential parameter group associated with the second machine learning model causes the second machine learning model to classify an associated one of the multiple positive samples as the positive type;

identifying, by the one or more processors, a target second influential parameter group for the first new sample with respect to the second machine learning model, wherein the target second influential parameter group causes the second machine learning model to classify the second new sample as the positive type; and in response to a difference between the influential parameter group and the target second influential parameter group being less than a predefined threshold value, keeping the second machine learning model as part of the updated model set, wherein the second machine learning model is used in the classifying of the first new sample based on the updated model set.

9. The method of claim 7, wherein the classifying the target sample based on the updated model set comprises:

responsive to determining that the updated model set is empty, classifying, by the one or more processors, the target sample as the negative type.

10. The method of claim 7, wherein the classifying the target sample based on the updated model set comprises:

responsive to determining that the updated model set is not empty, classifying, by the one or more processors, the target sample as the positive type.

11. A computer system comprising:

a computer processor; and a computer-readable memory unit that stores instructions that cause the computer processor to perform operations comprising:

generating multiple machine learning models respectively based on multiple positive samples included in an imbalanced dataset, wherein an amount of the multiple positive samples is below an amount of multiple negative samples that are included in the imbalanced dataset, and wherein each of the multiple positive samples and the multiple negative samples includes respective parameters;

identifying from the respective parameters multiple influential parameter groups respectively for the multiple positive samples, wherein the multiple influential parameter groups respectively cause the multiple machine learning models to classify an associated one of the multiple positive samples as a positive type; and determining a model set that includes at least some of the machine learning models; and inputting a first new sample into the model set such that the model set, in response classifies the first new sample as a positive type or a negative type, wherein the model set compares the multiple influential parameter groups to target influential parameter groups as part of the classifying.

12. The system of claim 11, wherein the generating the multiple machine learning models comprises:

obtaining a training dataset based on a first positive sample of the multiple positive samples, wherein the training dataset includes at least one positive training sample and negative training samples; and generating the multiple machine learning models by training an initial machine learning model with the training dataset.

13. The system of claim 12, wherein the obtaining the training dataset comprises:

obtaining the negative training samples, wherein the negative training samples include a first negative sample from the multiple negative samples of the imbalanced dataset and a second negative sample obtained by modifying one of the multiple positive samples of the imbalanced dataset into a negative sample; and adding the negative training samples into the training dataset.

14. The system of claim 12, wherein the obtaining the training dataset comprises:

obtaining the at least one positive training sample based on the first positive sample; and assigning a weight to the at least one positive training sample based on a ratio of an amount of the multiple negative training samples and an amount of the at least one positive training sample.

15. The system of claim 11, wherein the operations further comprise:

responsive to determining that a target sample is received, determining multiple types for the target sample based on the machine learning models included in the model set; and responsive to determining that all of the multiple types indicate the negative type, classifying the target sample as the negative type.

16. The system of claim 11, wherein the operations further comprise:

updating the model set to form an updated model set; and classifying a target sample based on the updated model set, wherein the classifying comprises responsive to determining that the updated model set is empty, classifying the target sample as the negative type.

17. The system of claim 11, wherein the operations further comprise:

updating the model set to form an updated model set; and classifying a target sample based on the updated model set, wherein the classifying comprises responsive to determining that the updated model set is not empty, classifying the target sample as the positive type.

18. A computer program product comprising:

a computer readable storage medium; and program instructions stored in the computer readable storage medium, the program instructions executable by a processor to cause the processor to perform operations comprising:

generating multiple machine learning models respectively based on multiple positive samples included in an imbalanced dataset, wherein an amount of the multiple positive samples is below an amount of multiple negative samples that are included in the imbalanced dataset, and wherein each of the multiple positive samples and the multiple negative samples includes respective parameters;

identifying from the respective parameters multiple influential parameter groups respectively for the multiple positive samples, wherein the multiple influential parameter groups respectively cause the multiple machine learning models to classify an associated one of the multiple positive samples as a positive type;

determining a model set that includes at least some of the multiple machine learning models; and inputting a first new sample into the model set such that the model set, in response, classifies the first new sample as a positive type or a negative type, wherein the model set compares the multiple influential parameter groups to target influential parameter groups as part of the classifying.

19. The product of claim 18, wherein the operations further comprise:

responsive to determining that a target sample is received, determining multiple types for the target sample based on the machine learning models included in the model set; and responsive to determining that all of the multiple types indicate the negative type, classifying the target sample as the negative type.

20. The product of claim 18, wherein the operations further comprise:

responsive to determining that at least one predictive type of multiple predictive types indicates the positive type for a target sample, identifying a target influential parameter group for the target sample;

updating the model set based on a difference between the influential parameter group associated with the machine learning model that indicated the positive type and the target influential parameter group to form an updated model set; and classifying the target sample based on the updated model set.

21. The product of claim 18, wherein the generating the multiple machine learning models comprises:

obtaining a training dataset based on a first positive sample of the multiple positive samples, wherein the training dataset includes at least one positive training sample and negative training samples; and generating the multiple machine learning models by training an initial machine learning model with the training dataset.

22. The product of claim 21, wherein the obtaining the training dataset comprises:

obtaining the negative training samples, wherein the negative training samples include a first negative sample from the multiple negative samples of the imbalanced dataset and a second negative sample obtained by modifying a first positive sample of the multiple positive samples of the imbalanced dataset into a negative sample; and adding the negative training samples into the training dataset.

23. The product of claim 21, wherein the obtaining the training dataset comprises:

obtaining the at least one positive training sample based on the first positive sample; and assigning a weight to the at least one positive training sample based on a ratio of an amount of the negative training samples and an amount of the at least one positive training sample.

* * * * *